US012718331B2

(12) United States Patent
Song et al.

(10) Patent No.: US 12,718,331 B2
(45) Date of Patent: Aug. 25, 2026

(54) GENERATING IMAGES USING A MACHINE LEARNING MODEL

(71) Applicant: Lemon Inc., Grand Cayman (KY)

(72) Inventors: Guoxian Song, Los Angeles, CA (US); You Xie, Los Angeles, CA (US); Hongyi Xu, Los Angeles, CA (US); Chao Wang, Los Angeles, CA (US); Linjie Luo, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 211 days.

(21) Appl. No.: 18/788,079

(22) Filed: Jul. 29, 2024

(65) Prior Publication Data

US 2026/0030725 A1 Jan. 29, 2026

(51) Int. Cl.

*G06T 5/00* (2024.01)
*G06T 3/00* (2024.01)
*G06T 3/18* (2024.01)
*G06T 5/50* (2006.01)
*G06T 5/60* (2024.01)

(52) U.S. Cl.

CPC .................. *G06T 5/60* (2024.01); *G06T 3/18* (2024.01); *G06T 5/50* (2013.01); *G06T 2207/20084* (2013.01)

(58) Field of Classification Search

None

See application file for complete search history.

(56) References Cited

U.S. PATENT DOCUMENTS

| | | | | |
|---|---|---|---|---|
| 11,983,853 | B1 * | 5/2024 | Zhu | G06T 5/70 |
| 12,333,681 | B1 * | 6/2025 | Fu | G06N 3/084 |
| 2021/0398301 | A1 * | 12/2021 | Guizilini | G06T 7/70 |
| 2023/0351624 | A1 * | 11/2023 | Ruhkamp | G06T 7/529 |
| 2024/0193873 | A1 * | 6/2024 | Chenna Madhavuni | G06T 7/70 |
| 2024/0411892 | A1 * | 12/2024 | Mummadi | G06F 21/64 |
| 2024/0411931 | A1 * | 12/2024 | Mummadi | G06F 21/64 |
| 2025/0111649 | A1 * | 4/2025 | Qiu | G06V 10/764 |
| 2026/0017921 | A1 * | 1/2026 | Salehi | G06V 10/762 |

* cited by examiner

*Primary Examiner* — Zhihan Zhou

(74) *Attorney, Agent, or Firm* — BakerHostetler

(57) ABSTRACT

The present disclosure describes techniques for generating images using a machine learning model. Features are extracted from a source image by a machine learning model. The source image comprises a portrait of a subject. A warp grid is generated based on the source image and a driving image by the machine learning model. The driving image depicts a pose or a visage. The warp grid indicates differences between the source image and the driving image. A warped source image is generated by applying the warp grid to the source image. A mask and a decoded image are generated based on the warp grid and the extracted features. An output image is generated based on the warped source image, the mask, and the decoded image. The output image depicts the subject having the pose or the visage.

20 Claims, 10 Drawing Sheets

Figure 6:
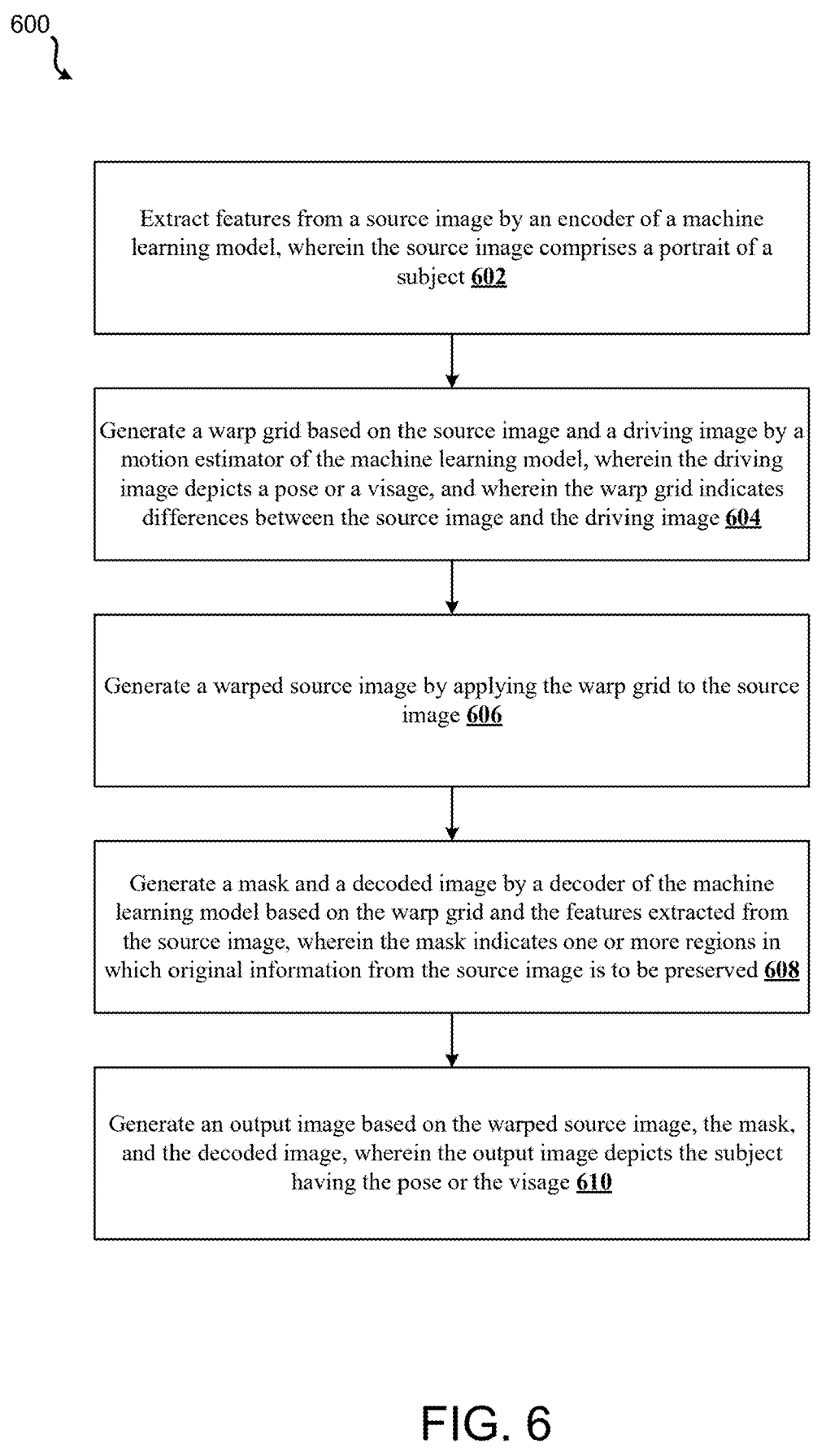

600

Extract features from a source image by an encoder of a machine learning model, wherein the source image comprises a portrait of a subject 602

↓

Generate a warp grid based on the source image and a driving image by a motion estimator of the machine learning model, wherein the driving image depicts a pose or a visage, and wherein the warp grid indicates differences between the source image and the driving image 604

↓

Generate a warped source image by applying the warp grid to the source image 606

↓

Generate a mask and a decoded image by a decoder of the machine learning model based on the warp grid and the features extracted from the source image, wherein the mask indicates one or more regions in which original information from the source image is to be preserved 608

↓

Generate an output image based on the warped source image, the mask, and the decoded image, wherein the output image depicts the subject having the pose or the visage 610

GENERATING IMAGES USING A MACHINE LEARNING MODEL

BACKGROUND

Machine learning models are increasingly being used across a variety of industries to perform a variety of different tasks. Such tasks may include content generation. Improved techniques for utilizing machine learning models for content generation are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 6 shows an example process for generating images using a machine learning model in accordance with the present disclosure.

DETAILED DESCRIPTION OF ILLUSTRATIVE EMBODIMENTS

Machine learning models can be used for generating portrait animations. In particular, machine learning models can be used to animate a static portrait image using head poses and facial aspects/visages from a driving video, with the driving video often featuring a different subject than the static portrait image. Portrait animation has gained significance in a variety of different downstream applications, such as video conferencing, visual effects, and digital agents. However, the animations generated using existing portrait animation techniques often contain blurriness, undesired artifacts, and reduced sharpness. Further, the animations generated using existing portrait animation techniques often fail to preserve the identity of the individual in the static portrait image and/or the motion in the generated animation does not precisely follow the driving video. As such, improved techniques are needed.

Described herein are improved techniques for generating images that are utilized to train machine learning models for generating portrait animations. The improved techniques described herein may generate a facial animation by a machine learning model based on a single portrait image (e.g., a source image) and driving frame(s) from a driving video. To improve the quality of the generated facial animation, and to address the aforementioned issues associated with existing portrait animation techniques, a residual inpainting module is integrated into the machine learning model architecture to enable the machine learning model to preserve original information from the source image for certain regions where no motion occurs. A local facial region loss is utilized during training of the machine learning model to enable the machine learning model to better preserve facial motion details. Further, a cross driven-training strategy is employed during training of the machine learning model to mitigate appearance leakage from the driving signal.

Figure 1:
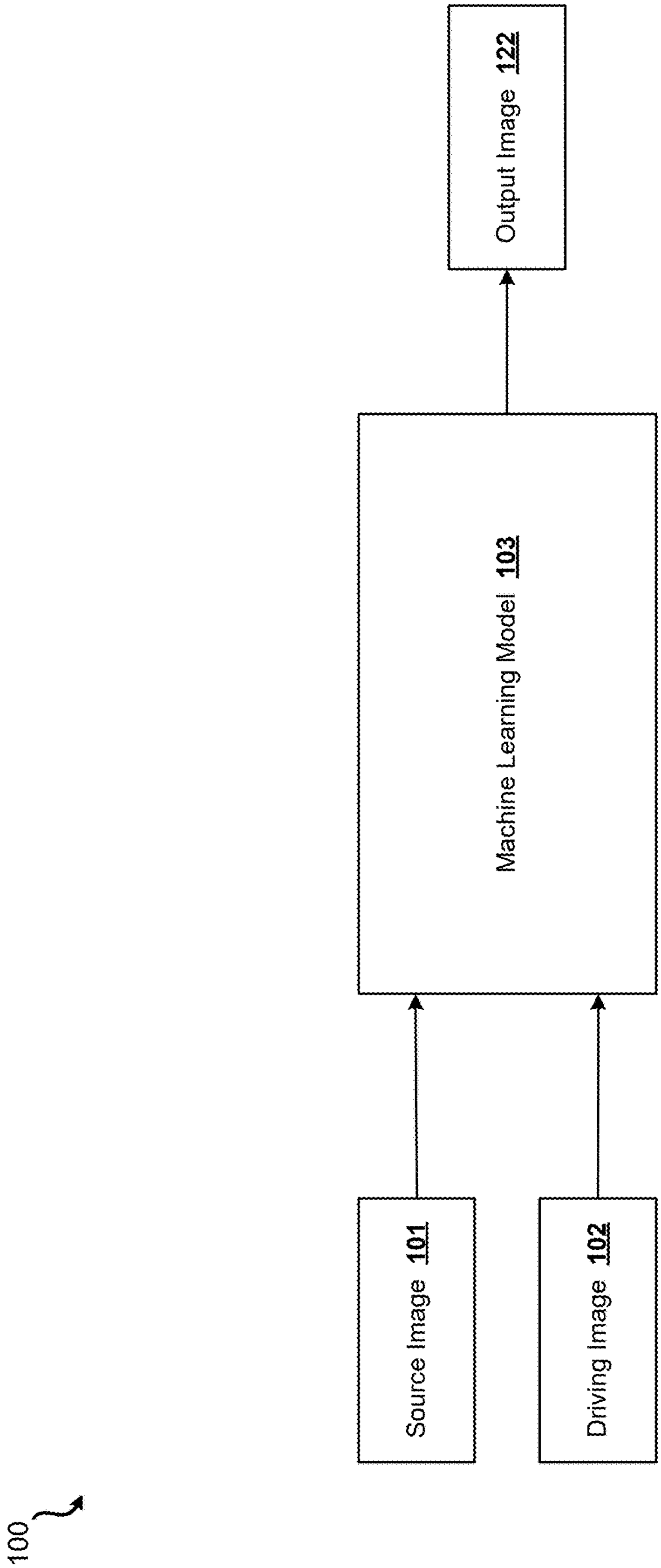
FIG. 1 shows an example system for generating images using a machine learning model in accordance with the present disclosure.

FIG. 1 illustrates an example system 100 in accordance with the present disclosure. The system 100 may be used for image generation using a machine learning model 103. For example, the system 100 may generate an output image using a single portrait image and driving frame(s) from a driving video.

A source image 101 and a driving image 102 can be input into the machine learning model 103. The source image 101 can include portrait of a subject (e.g., user, individual, person). The source image 101 can include an image of a face of the subject. The driving image 102 can depict a pose (e.g., a head pose) or a visage (e.g., facial aspect). In embodiments, the driving image 102 can depict the same subject in a certain pose or having a certain visage. For example, the driving image 102 and the source image 101 can be extracted from the same video (e.g., the driving image 102 and the source image 101 can be different frames of the same video). In other embodiments, the driving image 102 can depict a different subject in a certain pose or having a certain visage. These embodiments are discussed below in more detail with regard to FIGS. 2-3.

The machine learning model 103 may be trained to generate an output image 122 based on transferring the head pose and/or facial aspect associated with the driving image 102 to the subject depicted in the source image 101. For example, if the subject depicted in the source image 101 having a first visage or pose (e.g., smiling), and the driving image 102 depicts a subject (different subject, or same subject) that has a different visage or pose (e.g., not smiling), the machine learning model 103 may generate an output image 122 that depicts the subject having the different visage or pose (e.g., not smiling).

Figure 2:
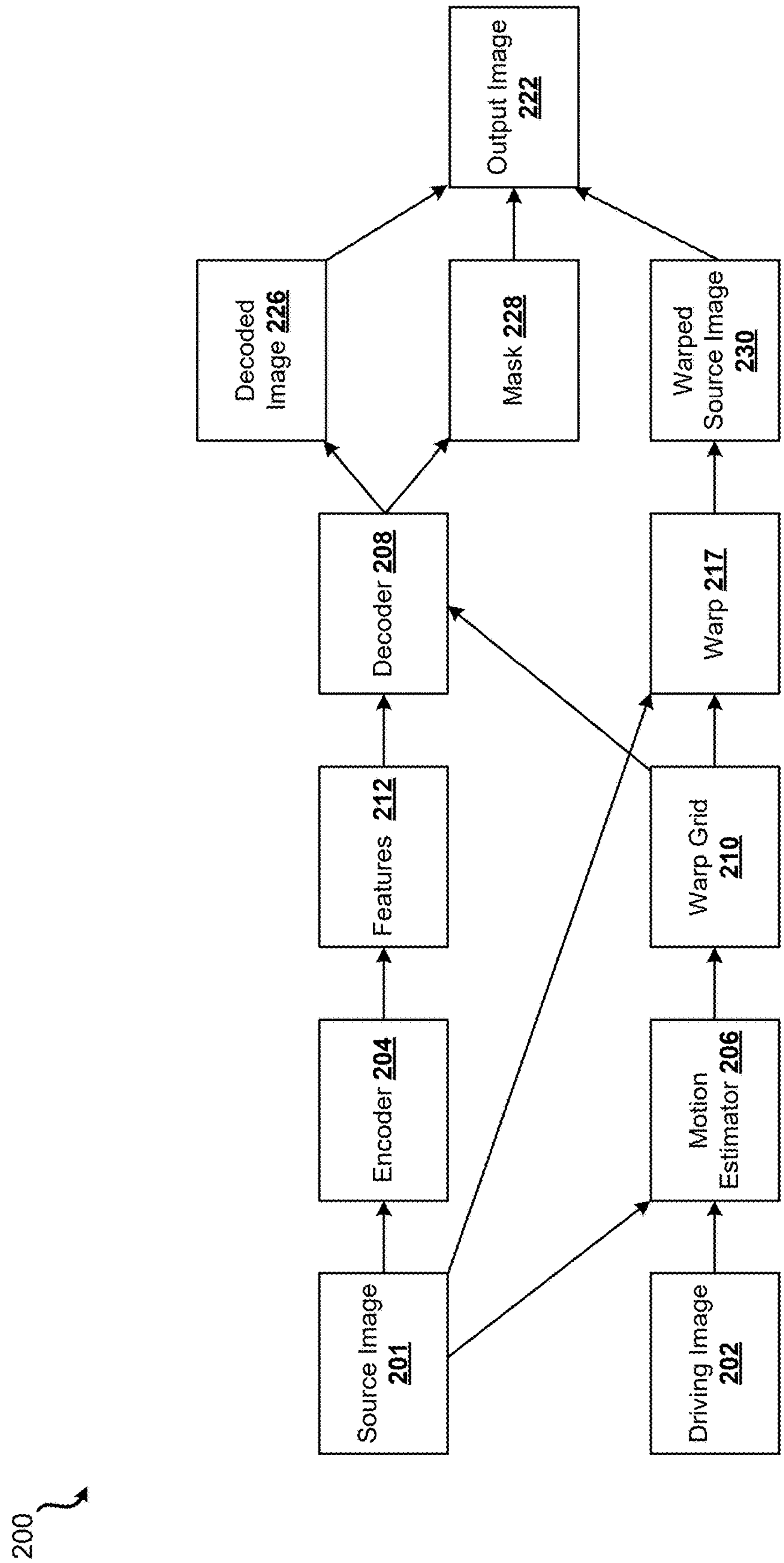
FIG. 2 shows an example system for generating images using a machine learning model in accordance with the present disclosure.

FIG. 2 illustrates an example system 200 in accordance with the present disclosure. The system 200 may be used for training a machine learning model (e.g., the machine learning model 103) to generate images. The machine learning model (e.g., the machine learning model 103) can include an encoder 204, a motion estimator 206, a decoder 208, and a warp component 217.

A source image 201 and a driving image 202 can be input into the machine learning model 103. The source image 201 can include portrait of a subject (e.g., user, individual, person). The source image 201 can include an image of a face of the subject. The driving image 202 can depict a pose (e.g., head pose) or an visage (e.g., facial aspect). The driving image 202 can depict the same subject in a certain pose or having a certain visage. For example, the driving image 202 and the source image 201 can be extracted from the same video (e.g., the driving image 202 and the source image 201 can be different frames of the same video).

The source image 201 can be input into the encoder 204 of the machine learning model 103. The encoder 204 can extract features 212 from the source image. The source image 201 and the driving image 202 can be input into the motion estimator 206. The motion estimator 206 can generate a warp grid 210 based on the source image 201 and the driving image 202. The warp grid 210 can indicate differences between the source image 201 and the driving image 202. For example, the warp grid 210 can include a motion field vector that indicates movement between the source image 201 and the driving image 202, such as movement of pixels between the source image 201 and the driving image 202.

The warp grid 210 and the source image 201 can be input into the warp component 217. The warp component 217 can generate a warped source image 230. The warp component 217 can generate the warped source image 230 based on the warp grid 210 and the source image 201. For example, the warp component 217 can generate the warped source image 230 by applying the warp grid 210 to the source image 210.

The warp grid 210 and the features 212 can be input into the decoder 208. The decoder 208 can generate a mask 228 and a decoded image 226. The decoder 208 can generate the decoded image 226 based on the warp grid 210 and the features 212 (i.e., appearance features extracted from the source image). The decoder 208 can also generate the mask 228 based on the features 212 and the warp grid 210. The mask 228 can indicate one or more regions in which original information from the source image 201 is to be preserved (e.g., to remain unchanged in the output image 222).

The machine learning model can generate an output image 222. The machine learning model can generate the output image 222 based on the warped source image 230, the mask 228, and the decoded image 226. The output image 222 can depict the subject having the pose or the visage. Some regions in the source image 201 (e.g., background, body, etc.) do not need to be re-generated. The machine learning model can be trained to learn the residual information using the following equation: output image=mask× warped source image+(1−mask)×decoded image. As such, training the machine learning model to generate the output image 222 utilizing the warped source image 230, the mask 228, and the decoded image 226 (as opposed to just the decoded image 226) enables the machine learning model to preserve original information from the source image 201.

To mitigate appearance leakage from the driving signal, the machine learning model can be trained using a cross-driven training strategy. After the machine learning model is trained as described above with regard to FIG. 2, cross-identity image pairs can be generated for the training of our driving signal. The machine learning model can be re-trained using the cross-identity image pairs.

Figure 3:
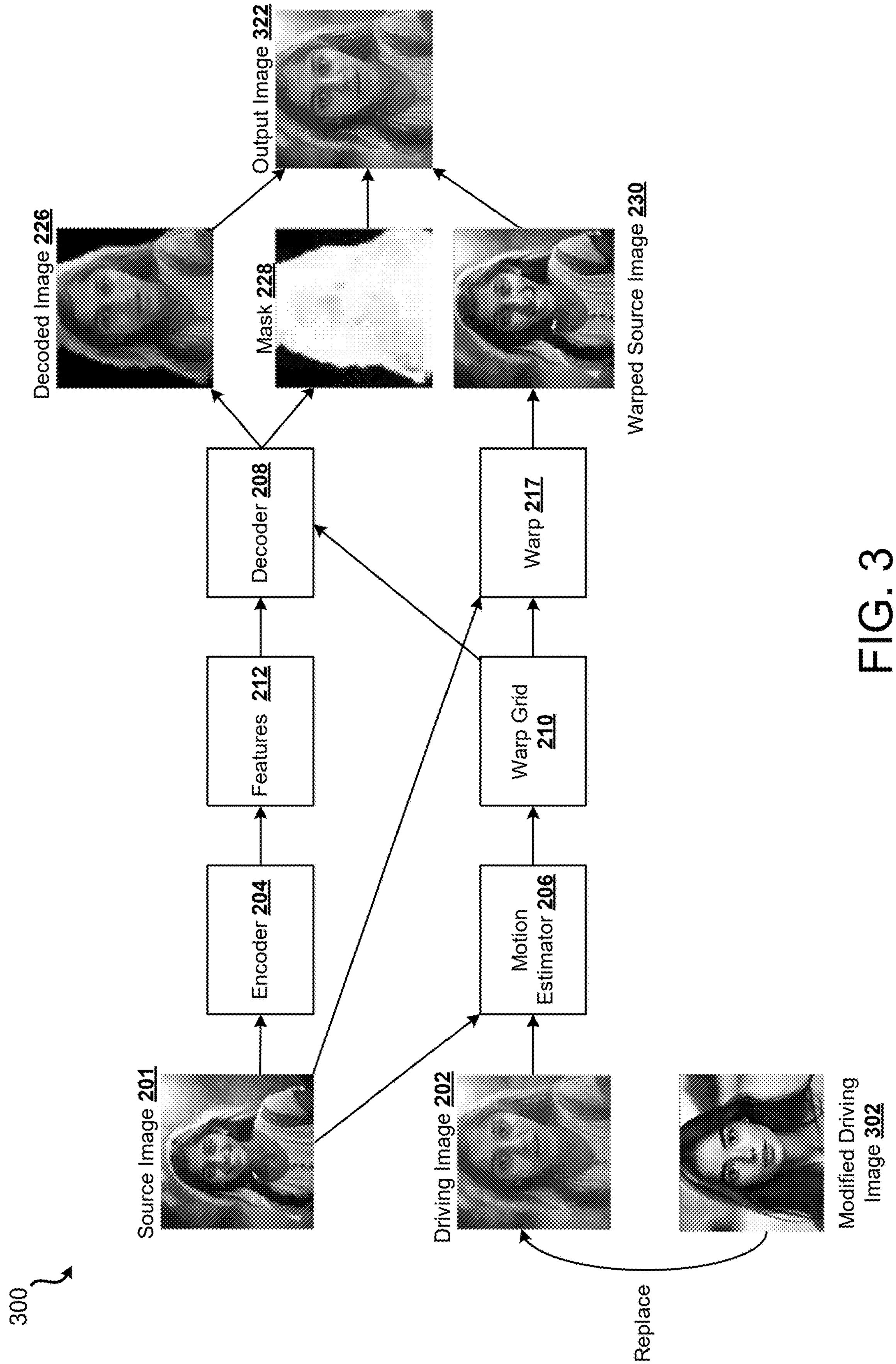
FIG. 3 shows an example system for generating images using a machine learning model in accordance with the present disclosure.

FIG. 3 illustrates an example system 300 in accordance with the present disclosure. The system 300 may be used for re-training the machine learning model (e.g., the machine learning model 103) to generate output images using cross-identity image pairs. The machine learning model can include the encoder 204, the motion estimator 206, the decoder 208, and a warp component 217.

As described above with regard to FIG. 2, the machine learning model can be trained using the source image 201 and the driving image 202. The source image 201 and the driving image 202 can depict the same subject (e.g., the same person). For example, the source image 201 and the driving image 202 can be extracted from a same video (e.g., different frames from the same video). The source image 201 can be input into the encoder 204 of the machine learning model 103. The encoder 204 can extract the features 212 from the source image. The source image 201 and the driving image 202 can be input into the motion estimator 206. The motion estimator 206 can generate the warp grid 210 based on the source image 201 and the driving image 202. The warp grid 210 and the source image 201 can be input into the warp component 217. The warp component 217 can generate the warped source image 230 based on the warp grid 210 and the source image 201. The warp grid 210 and the features 212 can be input into the decoder 208. The decoder 208 can generate the mask 228 and the decoded image 226 based on the warp grid 210 and the features 212. The machine learning model can generate the output image 222 based on the warped source image 230, the mask 228, and the decoded image 226.

After the machine learning model is trained in this manner, the driving image 202 can be replaced with a modified driving image 302. The modified driving image 302 depicts a different subject (e.g., a different person) than the source image 201 and the driving image 202. The different subject depicted in the modified driving image 302 can have the same pose or the same visage as depicted in the driving image 202. The source image 201 and the modified driving image 302 can constitute one cross-identity image training pair. The machine learning model can be re-trained using cross-identity image pairs(s). For example, the machine learning model can be re-trained to generate a new output image 322 using the cross-identify image training pair comprising the source image 201 and the modified driving image 302. Re-training the machine learning model using the cross-identity image pairs can mitigate appearance leakage from the driving image 202 that comprises the same subject as the source image 201.

To better preserve facial motion details in the images output by the machine learning model, extra diverse losses grounded in local features can be employed during training of the machine learning model. Employing extra diverse losses grounded in local features during training of the machine learning model can enhance local motion accuracy around the eyes and mouth.

Figure 4:
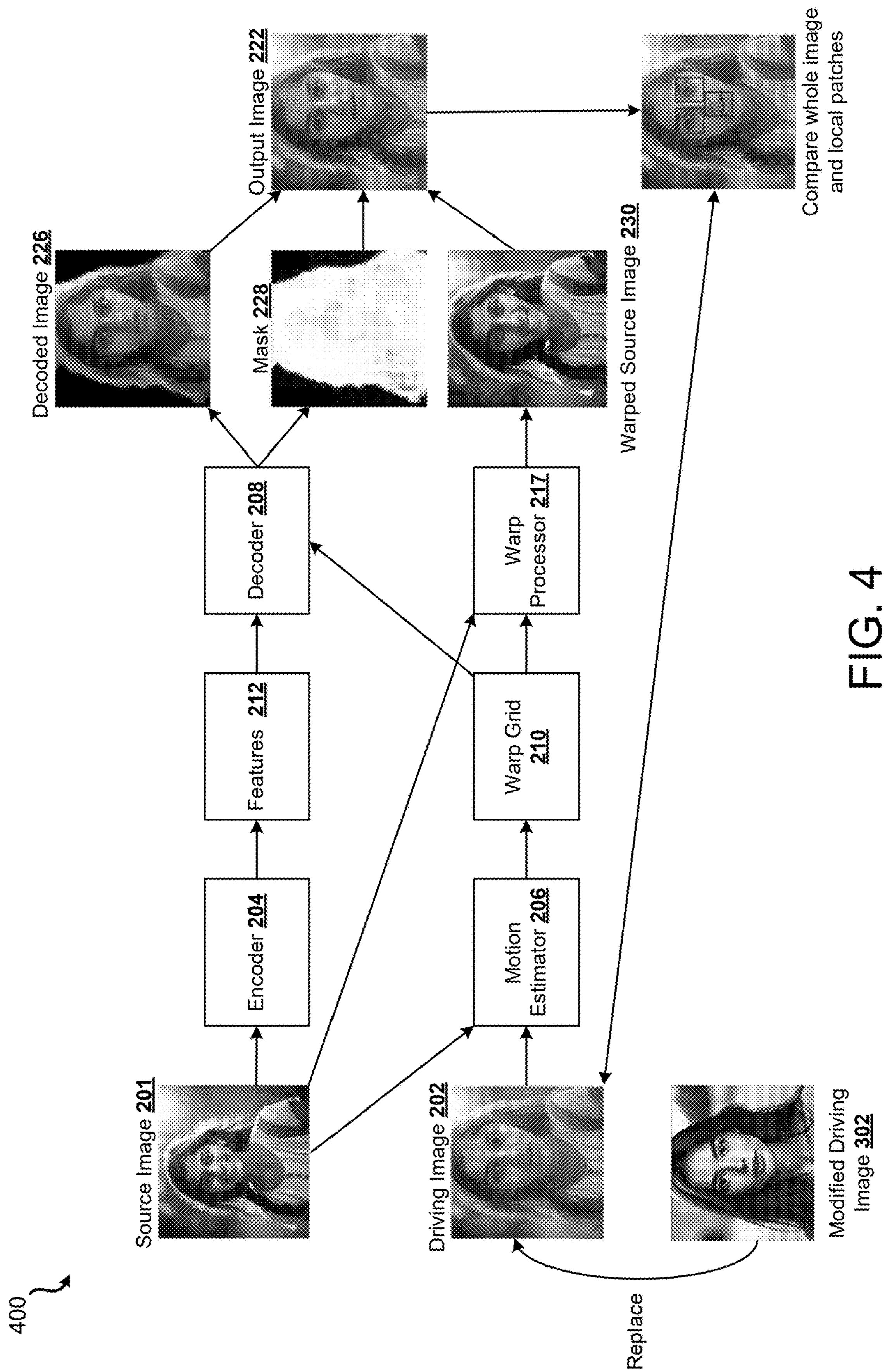
FIG. 4 shows an example system for generating images using a machine learning model in accordance with the present disclosure.

FIG. 4 shows illustrates an example system 400 in accordance with the present disclosure. The system 400 may be used for employing extra diverse losses grounded in local features during training of the machine learning model (e.g., the machine learning model 103). The machine learning model can include the encoder 204, the motion estimator 206, the decoder 208, and a warp component 217.

A global loss can be applied during training of the machine learning model. The global loss can be applied each time the machine learning model generates an output image (e.g., the output image 222 or the output image 322). The global loss can be applied based on comparing an entirety of the output image with an entirety of the driving image.

However, such global loss treats motion in every pixel with equal weight. Localized attention can be enhanced. For example, localized attention can be enhanced for critical facial region(s) to enable better animation realism and finer control granularity. In addition to, or as an alternative to applying the global loss during training of the machine learning model, a local region loss can be applied during training of the machine learning model. Applying the local region loss can include comparing local patches of each output image with corresponding local patches of the corresponding driving image. The local patches can include a local patch associated with a mouth region and one or more local patches associated with eye regions. In examples, the local patches can be generated based on detecting landmarks for both the eyes and the mouth and using the centers of the landmarks to crop patches with a dimension of 128×128 pixels.

Comparing the local patches of each output image with the corresponding local patches of the corresponding driving image can include comparing the local patch associated with a mouth region in the output image with the local patch associated with a mouth region in the driving image. Likewise, comparing the local patches of each output image with the corresponding local patches of the corresponding driving image can include comparing the local patch(es) associated with the eye region(s) in the output image with the local patch(es) associated with the eye region(s) in the driving image. For example, throughout the training of the machine learning model, the local regions (e.g., eyes and/or mouth) can be subjected to L2 loss, adversarial loss, and VGG feature matching loss using the following local region loss equation: Local region loss=||generated local patches−driving local patches||(L2, adversarial loss, VGG feature matching loss).

The trained machine learning model can be utilized to generate a plurality of training pairs. Each training pair among the plurality of training pairs can include a source image (e.g., the source image 201), a driving image (e.g., the modified driving image 302), and an output image (e.g., the output image 322). The plurality of training pairs can be utilized to train another machine learning model for generating portrait animations.

Figure 5:
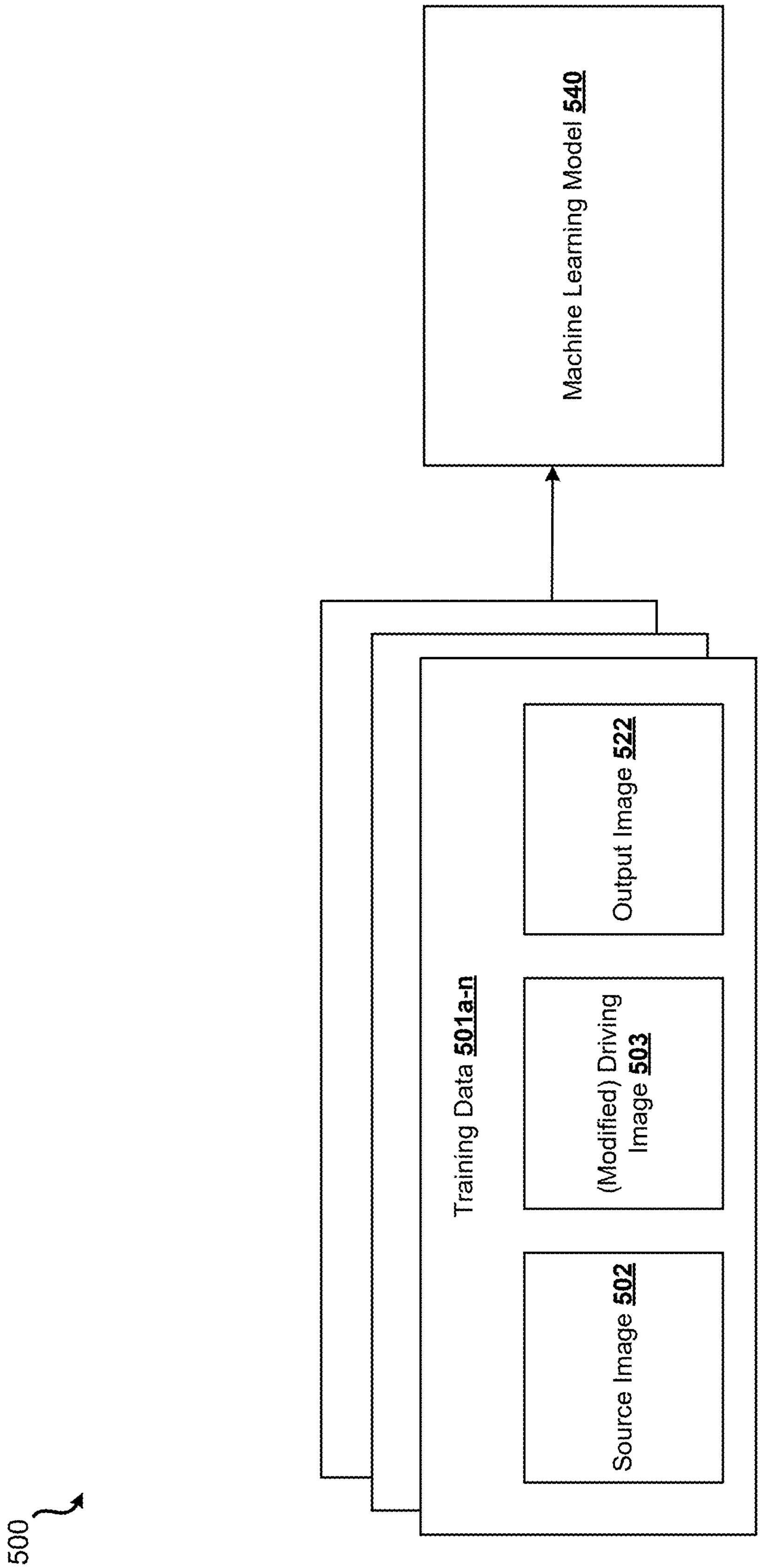
FIG. 5 shows an example system for generating training pairs using a machine learning model in accordance with the present disclosure.

FIG. 5 shows an example system 500 in accordance with the present disclosure. The system 500 may be used for training a different machine learning model to generate portrait animations. The system 500 can include a plurality of training data pairs 501*a-n*. Each training data pair among the plurality of training data pairs 501*a-n* can be generated by the machine learning model (e.g., the machine learning model 103) as described in the present disclosure. Each training data pair among the plurality of training data pairs 501*a-n* can include a source image 502, a driving image 503, and an output image 522. The driving image 503 can depict a different subject than the source image 502.

The machine learning model (e.g., the machine learning model 103) can generate a particular training data pair among the plurality of training data pairs 501*a-n* using the techniques similar to those described above. For example, the source image 502 can be input into an encoder (e.g., encoder 204) of the machine learning model. The encoder can extract appearance features from the source image 502. The source image 502 and the driving image 503 can be input into a motion estimator (e.g., motion estimator 206) of the machine learning model. The motion estimator can generate a warp grid (e.g., warp grid 210) based on the source image 502 and the driving image 503. The warp grid and the source image 502 can be input into a warp component (e.g., warp component 217) of the machine learning model. The warp component can generate a warped source image (e.g., warped source image 230) based on the warp grid and the source image 502. The warp grid and the appearance features extracted from the source image 502 can be input into a decoder (e.g., decoder 208) of the machine learning model. The decoder can generate a mask (e.g., mask 228) and a decoded image (e.g., the decoded image 226) based on the warp grid and the appearance features. The machine learning model can generate the output image 522 based on the warped source image, the mask, and the decoded image.

The plurality of training data pairs 501*a-n* can be input into a second machine learning model 540 to train the second machine learning model 540. The second machine learning model 540 may be trained to generate animated portraits. For example, the second machine learning model 540 may be trained to animate a static portrait image using head poses and facial aspects/visages from a driving video, with the driving video often featuring a different subject than the static portrait image.

FIG. 6 illustrates an example process 600 for generating images using a machine learning model. Although depicted as a sequence of operations in FIG. 6, those of ordinary skill in the art will appreciate that various embodiments may add, remove, reorder, or modify the depicted operations.

At 602, features (e.g., features 212) can be extracted from a source image (e.g., source image 201). The features can be extracted by an encoder (e.g., encoder 204) of a machine learning model (e.g., machine learning model 103). The source image can include a portrait of a subject (e.g., a person). The source image and a driving image (e.g., driving image 202 or modified driving image 302) can be input into a motion estimator (e.g., motion estimator 206) of the machine learning model. The driving image can depict a pose or a visage. For example, the driving image can depict the same subject as the source image in the pose or having the visage. Alternatively, the driving image can depict a different subject from the source image in the pose or having the visage.

At 604, a warp grid (e.g., warp grid 210) can be generated. The warp grid can be generated based on the source image and the driving image. The warp grid can be generated by the motion estimator of the machine learning model. The warp grid can indicate differences between the source image and the driving image. For example, the warp grid can include a motion field vector that indicates movement between the source image and the driving image, such as movement of pixels between the source image and the driving image.

At 606, a warped source image (e.g., warped source image 230) can be generated. The warped source image can be generated by applying the warp grid to the source image. At 608, a mask (e.g., mask 228) and a decoded image (e.g., decoded image 226) can be generated. The mask and the decoded image can be generated by a decoder (e.g., decoder 208) of the machine learning model based on the warp grid and the appearance features extracted from the source image. Some regions in the source image (e.g., background, body, etc.) do not need to be re-generated. The mask indicates the regions in which original information from the source image is to be preserved.

At 610, an output image (e.g., output image 222) can be generated. The output image can be generated based on the warped source image, the mask, and the decoded image. The output image can depict the subject in the source image having the pose or the visage indicated in the driving image.

Figure 7:
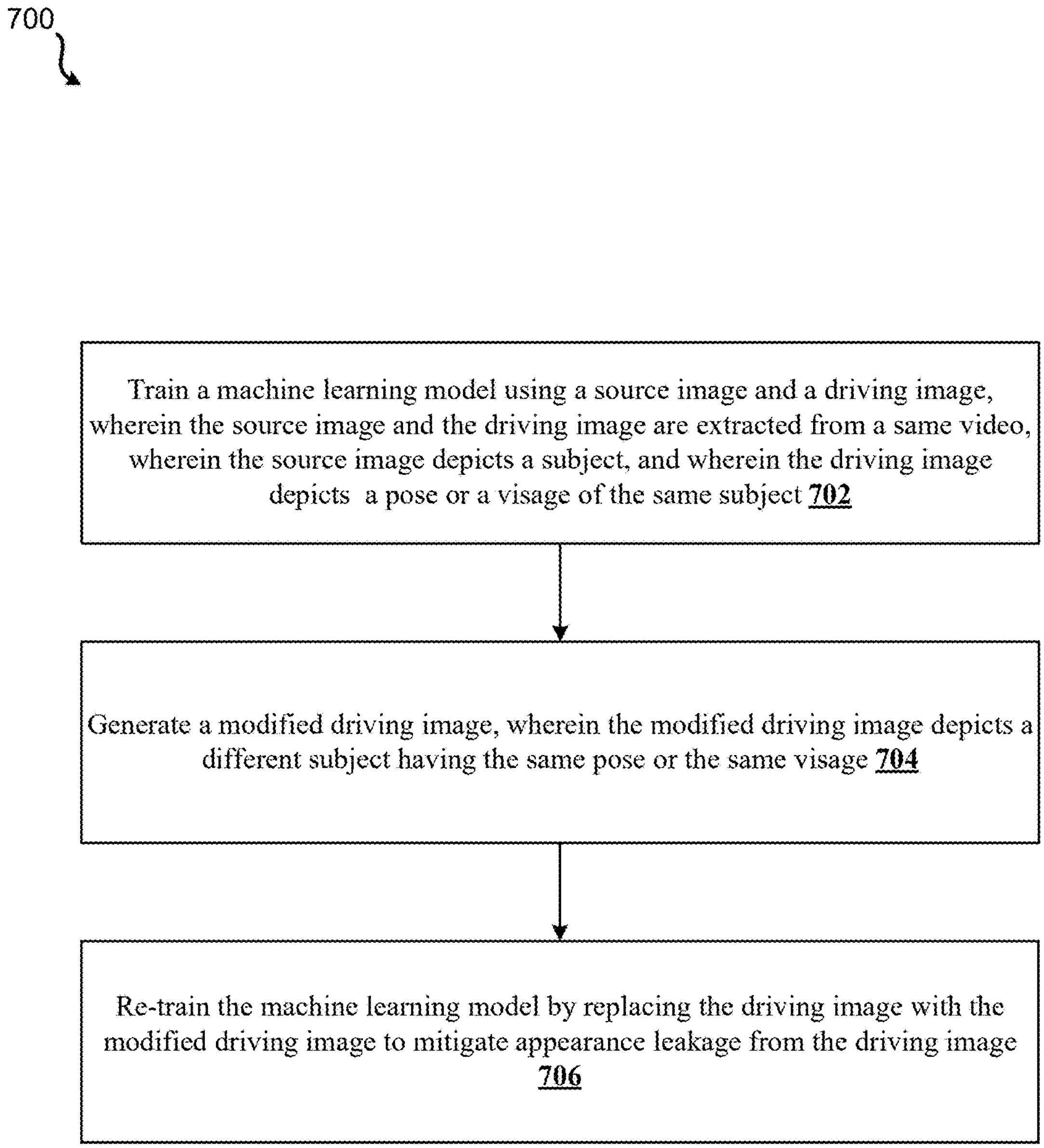
FIG. 7 shows an example process for training a machine learning model in accordance with the present disclosure.

FIG. 7 illustrates an example process 700 for training a machine learning model. Although depicted as a sequence of operations in FIG. 7, those of ordinary skill in the art will appreciate that various embodiments may add, remove, reorder, or modify the depicted operations.

At 702, a machine learning model (e.g., machine learning model 103) can be trained. The machine learning model can be trained using a source image (e.g., source image 201) and a driving image (e.g., driving image 202). The source image and the driving image can be extracted from the same video. For example, the source image and the driving image can each be different frames of the same video. The source image depicts a subject. The driving image depicts a pose or a visage of the same subject.

Training the machine learning model using the source image and the driving image can include inputting the source image into an encoder (e.g., encoder 204) of the machine learning model. The encoder can extract features (e.g., features 212) from the source image. The source image and the driving image can be input into a motion estimator (e.g., motion estimator 206) of the machine learning model. The motion estimator can generate a warp grid (e.g., warp grid 210) based on the source image and the driving image. The warp grid and the source image can be input into a warp component (e.g., warp component 217) of the machine learning model. The warp component can generate a warped source image (e.g., warped source image 230) based on the warp grid and the source image. The warp grid and the features can be input into a decoder (e.g., decoder 208). The decoder can generate a mask (e.g., mask 228) and a decoded image (e.g., decoded image 226) based on the warp grid and the features. The machine learning model can generate an output image (e.g., output image 222) based on the warped source image, the mask, and the decoded image.

After the machine learning model is trained in this manner, the driving image can be replaced with a modified driving image. At 704, a modified driving image can be generated. The modified driving image depicts a different subject than the source image and the driving image, but the different subject still has the same pose or the same visage as the subject depicted in the driving image. At 706, the machine learning model can be re-trained. The machine learning model can be re-trained by replacing the driving image with the modified driving image. Re-training the machine learning model with the modified driving image can mitigate appearance leakage from the driving image that depicts the same subject as the source image.

Figure 8:
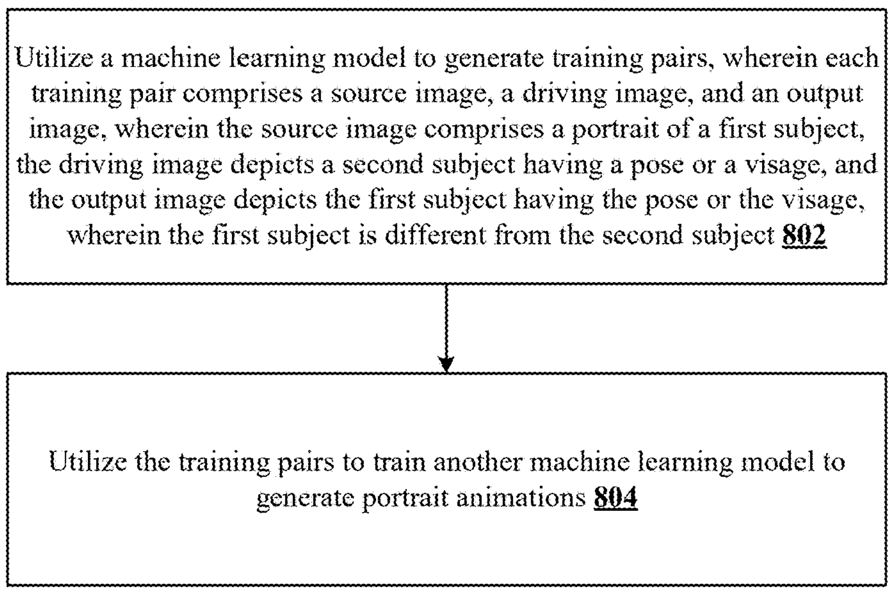
FIG. 8 shows an example process for generating training pairs using a machine learning model in accordance with the present disclosure.

FIG. 8 illustrates an example process 800 for generating training pairs using a machine learning model. Although depicted as a sequence of operations in FIG. 8, those of ordinary skill in the art will appreciate that various embodiments may add, remove, reorder, or modify the depicted operations.

At 802, a machine learning model (e.g., machine learning model 103) can be utilized to generate training pairs (e.g., the plurality of training data pairs 501*a-n*). Each training pair comprises a source image (e.g., source image 502), a driving image (e.g., driving image 503), and an output image (e.g., output image 522). The source image can include a portrait of a first subject. The driving image can depict a second subject having a pose or a visage. The output image can depict the first subject having the pose or the visage. The first subject can be different from the second subject.

The training pairs can be input into another machine learning model (e.g., machine learning model 540) to train the another machine learning model. At 804, the training pairs can be utilized to train another machine learning model to generate portrait animations. For example, the another machine learning model can be trained to animate a static portrait image using head poses and facial visages from driving images, with the driving images featuring a different subject than a subject in the static portrait image.

Figure 9:
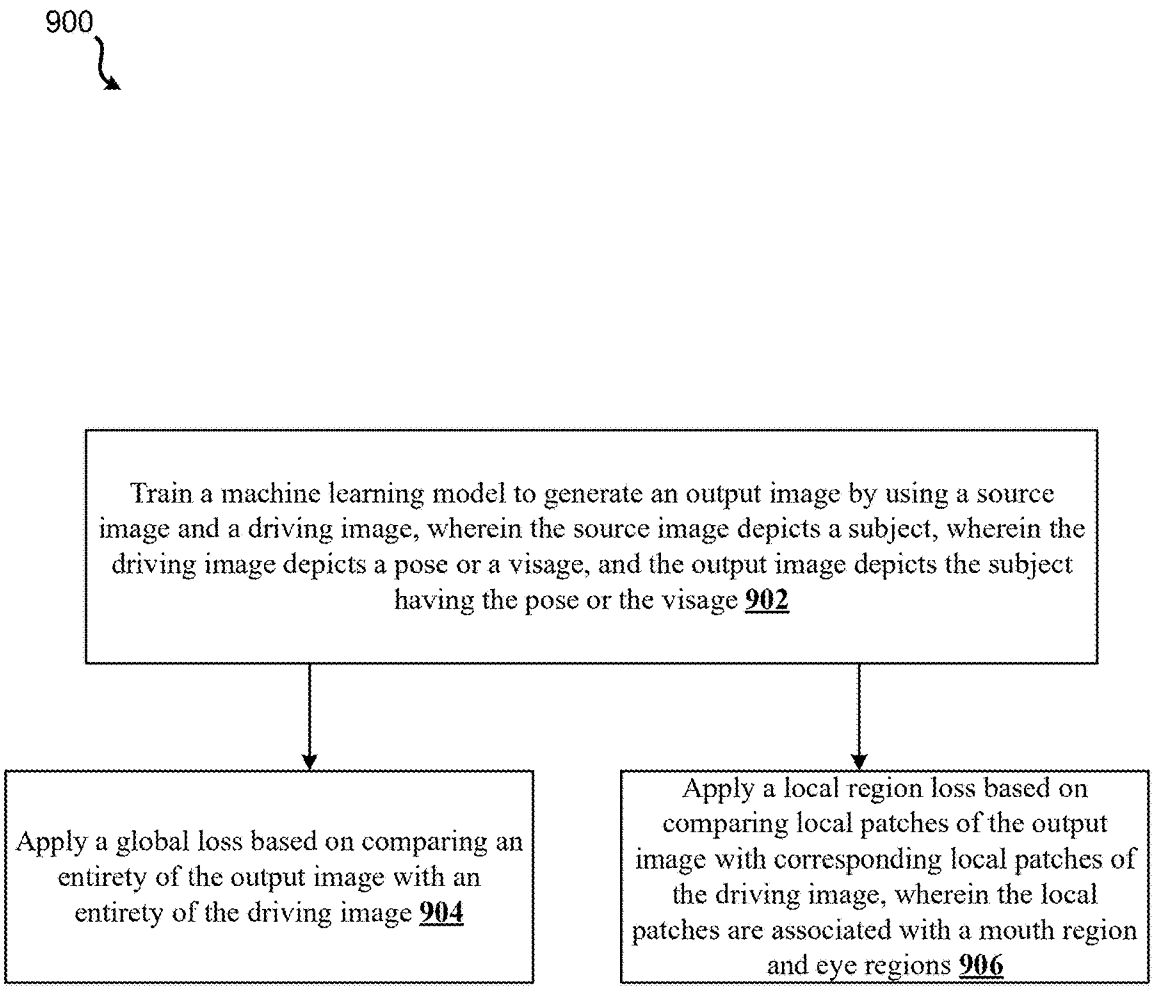
FIG. 9 shows an example process for training a machine learning model in accordance with the present disclosure.

FIG. 9 illustrates an example process 900 for training a machine learning model. Although depicted as a sequence of operations in FIG. 9, those of ordinary skill in the art will appreciate that various embodiments may add, remove, reorder, or modify the depicted operations.

At 902, a machine learning model (e.g., machine learning model 103) can be trained. The machine learning model can be trained using a source image (e.g., source image 201) and a driving image (e.g., driving image 202). The source image and the driving image can be extracted from the same video. For example, the source image and the driving image can each be different frames of the same video. The source image depicts a subject. The driving image can depict a pose or a visage of the same subject. Alternatively, the driving image can depict a pose or a visage of a different subject.

Training the machine learning model using the source image and the driving image can include inputting the source image into an encoder (e.g., encoder 204) of the machine learning model. The encoder can extract features (e.g., features 212) from the source image. The source image and the driving image can be input into a motion estimator (e.g., motion estimator 206) of the machine learning model. The motion estimator can generate a warp grid (e.g., warp grid 210) based on the source image and the driving image. The warp grid and the source image can be input into a warp component (e.g., warp component 217) of the machine learning model. The warp component can generate a warped source image (e.g., warped source image 230) based on the warp grid and the source image. The warp grid and the features can be input into a decoder (e.g., decoder 208). The decoder can generate a mask (e.g., mask 228) and a decoded image (e.g., decoded image 226) based on the warp grid and the features. The machine learning model can generate an output image (e.g., output image 222) based on the warped source image, the mask, and the decoded image.

To better preserve facial motion details in the images output by the machine learning model, extra diverse losses grounded in local features can be employed during training of the machine learning model. Employing extra diverse losses grounded in local features during training of the machine learning model can enhance local motion accuracy around the eyes and mouth.

At 904, a global loss can be applied during training of the machine learning model. The global loss can be applied each time the machine learning model generates an output image (e.g., the output image 222 or the output image 322). The global loss can be applied based on comparing an entirety of the output image with an entirety of the driving image.

In addition to, or as an alternative to applying the global loss during training of the machine learning model, a local region loss can be applied during training of the machine learning model. At 906, a local region loss can be applied. Applying the local region loss can include comparing local patches of each output image with corresponding local patches of the corresponding driving image. The local patches can include a local patch associated with a mouth region and one or more local patches associated with eye regions. Comparing the local patches of each output image with the corresponding local patches of the corresponding driving image can include comparing the local patch associated with a mouth region in the output image with the local patch associated with a mouth region in the driving image. Likewise, Comparing the local patches of each output image with the corresponding local patches of the corresponding driving image can include comparing the local patch(es) associated with the eye region(s) in the output image with the local patch(es) associated with the eye region(s) in the driving image.

Figure 10:
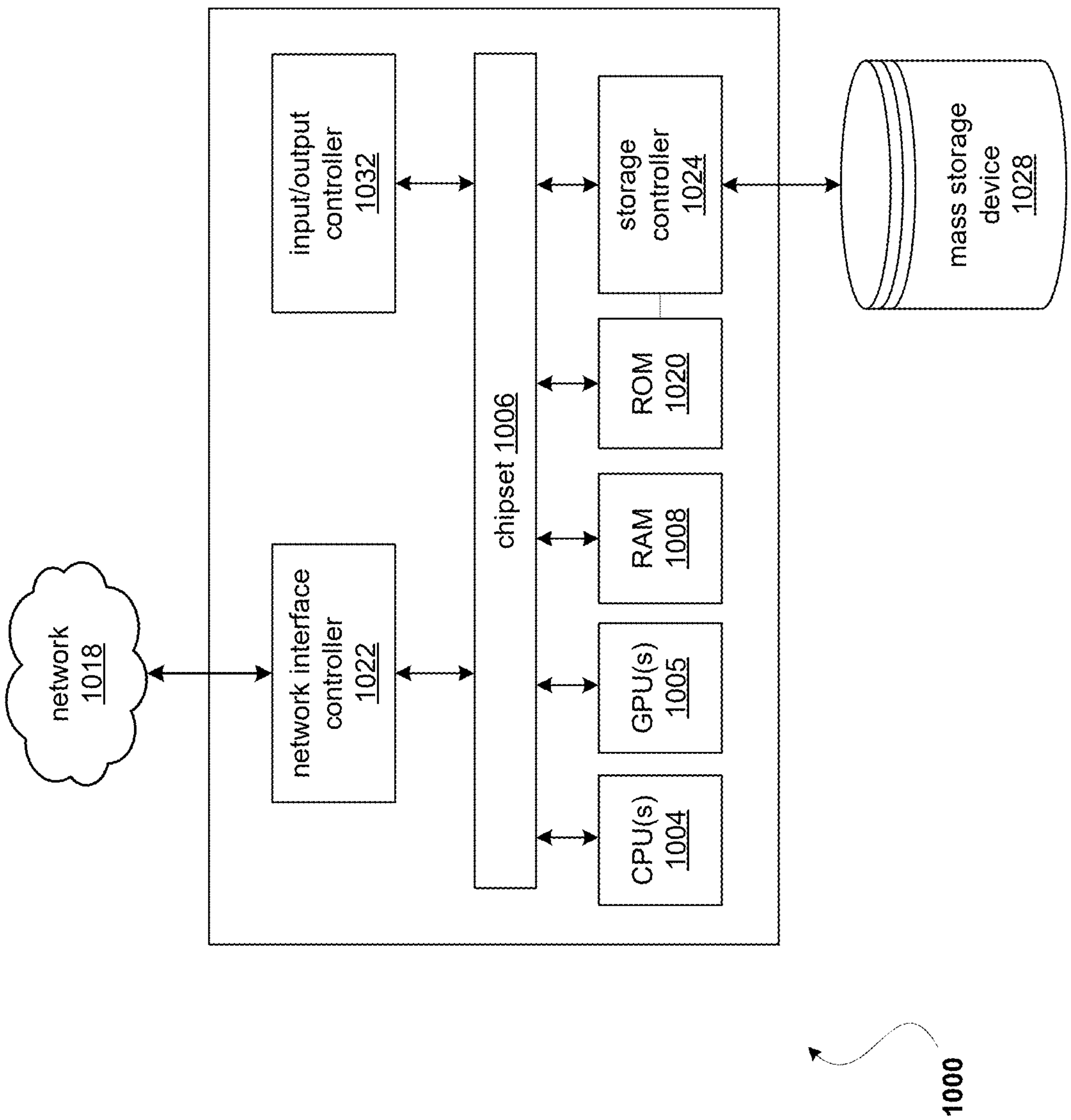
FIG. 10 shows an example computing device which may be used to perform any of the techniques disclosed herein.

FIG. 10 illustrates a computing device that may be used in various aspects, such as the services, networks, modules, and/or devices depicted in any of FIGS. 1-5. With regard to FIGS. 1-5, any or all of the components may each be implemented by one or more instance of a computing device 1000 of FIG. 10. The computer architecture shown in FIG. 10 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1000 may include a baseboard, or "motherboard," which is a printed circuit board to which a multitude of components or devices may be connected by way of a system bus or other electrical communication paths. One or more central processing units (CPUs) 1004 may operate in conjunction with a chipset 1006. The CPU(s) 1004 may be standard programmable processors that perform arithmetic and logical operations necessary for the operation of the computing device 1000.

The CPU(s) 1004 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1004 may be augmented with or replaced by other processing units, such as GPU(s) 1005. The GPU(s) 1005 may comprise processing units specialized for but not necessarily limited to highly parallel computations, such as graphics and other visualization-related processing.

A chipset 1006 may provide an interface between the CPU(s) 1004 and the remainder of the components and devices on the baseboard. The chipset 1006 may provide an interface to a random-access memory (RAM) 1008 used as the main memory in the computing device 1000. The chipset 1006 may further provide an interface to a computer-readable storage medium, such as a read-only memory (ROM) 1020 or non-volatile RAM (NVRAM) (not shown), for storing basic routines that may help to start up the computing device 1000 and to transfer information between the various components and devices. ROM 1020 or NVRAM may also store other software components necessary for the operation of the computing device 1000 in accordance with the aspects described herein.

The computing device 1000 may operate in a networked environment using logical connections to remote computing nodes and computer systems through local area network (LAN). The chipset 1006 may include functionality for providing network connectivity through a network interface controller (NIC) 1022, such as a gigabit Ethernet adapter. A NIC 1022 may be capable of connecting the computing device 1000 to other computing nodes over a network 1016. It should be appreciated that multiple NICs 1022 may be present in the computing device 1000, connecting the computing device to other types of networks and remote computer systems.

The computing device 1000 may be connected to a mass storage device 1028 that provides non-volatile storage for the computer. The mass storage device 1028 may store system programs, application programs, other program modules, and data, which have been described in greater detail herein. The mass storage device 1028 may be connected to the computing device 1000 through a storage controller 1024 connected to the chipset 1006. The mass storage device 1028 may consist of one or more physical storage units. The mass storage device 1028 may comprise a management component 1010. A storage controller 1024 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1000 may store data on the mass storage device 1028 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1028 is characterized as primary or secondary storage and the like.

For example, the computing device 1000 may store information to the mass storage device 1028 by issuing instructions through a storage controller 1024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1000 may further read information from the mass storage device 1028 by detecting the physical states or characteristics of one or more particular locations within the physical storage units.

In addition to the mass storage device 1028 described above, the computing device 1000 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1000.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1028 depicted in FIG. 10, may store an operating system utilized to control the operation of the computing device 1000. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1028 may store other system or application programs and data utilized by the computing device 1000.

The mass storage device 1028 or other computer-readable storage media may also be encoded with computer-executable instructions, which, when loaded into the computing device 1000, transforms the computing device from a general-purpose computing system into a special-purpose computer capable of implementing the aspects described herein. These computer-executable instructions transform the computing device 1000 by specifying how the CPU(s) 1004 transition between states, as described above. The computing device 1000 may have access to computer-readable storage media storing computer-executable instructions, which, when executed by the computing device 1000, may perform the methods described herein.

A computing device, such as the computing device 1000 depicted in FIG. 10, may also include an input/output controller 1032 for receiving and processing input from a number of input devices, such as a keyboard, a mouse, a touchpad, a touch screen, an electronic stylus, or other type of input device. Similarly, an input/output controller 1032 may provide output to a display, such as a computer monitor, a flat-panel display, a digital projector, a printer, a plotter, or other type of output device. It will be appreciated that the computing device 1000 may not include all of the components shown in FIG. 10, may include other components that are not explicitly shown in FIG. 10, or may utilize an architecture completely different than that shown in FIG. 10.

As described herein, a computing device may be a physical computing device, such as the computing device 1000 of FIG. 10. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of generating images using a machine learning model, comprising:

extracting features from a source image by an encoder of the machine learning model, wherein the source image comprises a portrait of a subject;

generating a warp grid based on the source image and a driving image by a motion estimator of the machine learning model, wherein the driving image depicts a pose or a visage, and wherein the warp grid indicates differences between the source image and the driving image;

generating a warped source image by applying the warp grid to the source image;

generating a mask and a decoded image by a decoder of the machine learning model based on the warp grid and the features extracted from the source image, wherein the mask indicates one or more regions in which original information from the source image is to be preserved; and generating an output image based on the warped source image, the mask, and the decoded image, wherein the output image depicts the subject having the pose or the visage.

2. The method of claim 1, further comprising:

replacing the driving image with a modified driving image to mitigate appearance leakage from the driving image, wherein the modified driving image depicts a different subject having the pose or the visage.

3. The method of claim 1, further comprising:

utilizing the machine learning model to generate training pairs, wherein each training pair comprises the source image, the modified driving image, and the output image, and wherein the training pairs are utilized to train another machine learning model for generating portrait animations.

4. The method of claim 1, further comprising:

applying a global loss based on comparing an entirety of the output image with an entirety of the driving image.

5. The method of claim 1, further comprising:

applying a local region loss based on comparing local patches of the output image with corresponding local patches of the driving image.

6. The method of claim 5, wherein the local patches comprise a local patch associated with a mouth region and local patches associated with eye regions.

7. The method of claim 1, further comprising:

extracting the source image and the driving image from a same video.

8. The method of claim 1, wherein the pose comprises a head pose, and the visage comprises a facial visage.

9. A system of generating images using a machine learning model, comprising:

at least one processor; and at least one memory communicatively coupled to the at least one processor and comprising computer-readable instructions that upon execution by the at least one processor cause the at least one processor to perform operations comprising:

extracting features from a source image by an encoder of the machine learning model, wherein the source image comprises a portrait of a subject;

generating a warp grid based on the source image and a driving image by a motion estimator of the machine learning model, wherein the driving image depicts a pose or a visage, and wherein the warp grid indicates differences between the source image and the driving image;

generating a warped source image by applying the warp grid to the source image;

generating a mask and a decoded image by a decoder of the machine learning model based on the warp grid and the features extracted from the source image, wherein the mask indicates one or more regions in which original information from the source image is to be preserved; and generating an output image based on the warped source image, the mask, and the decoded image, wherein the output image depicts the subject having the pose or the visage.

10. The system of claim 9, the operations further comprising:

replacing the driving image with a modified driving image to mitigate appearance leakage from the driving image, wherein the modified driving image depicts a different subject having the pose or the visage.

11. The system of claim 9, the operations further comprising:

utilizing the machine learning model to generate training pairs, wherein each training pair comprises the source image, the modified driving image, and the output image, and wherein the training pairs are utilized to train another machine learning model for generating portrait animations.

12. The system of claim 9, the operations further comprising:

applying a global loss based on comparing an entirety of the output image with an entirety of the driving image.

13. The system of claim 9, the operations further comprising:

applying a local region loss based on comparing local patches of the output image with corresponding local patches of the driving image.

14. The system of claim 13, wherein the local patches comprise a local patch associated with a mouth region and local patches associated with eye regions.

15. The system of claim 9, wherein the pose comprises a head pose, and the visage comprises a facial visage.

16. A non-transitory computer-readable storage medium, storing computer-readable instructions that upon execution by a processor cause the processor to implement operations comprising:

extracting features from a source image by an encoder of the machine learning model, wherein the source image comprises a portrait of a subject;

generating a warp grid based on the source image and a driving image by a motion estimator of the machine learning model, wherein the driving image depicts a pose or a visage, and wherein the warp grid indicates differences between the source image and the driving image;

generating a warped source image by applying the warp grid to the source image;

generating a mask and a decoded image by a decoder of the machine learning model based on the warp grid and the features extracted from the source image, wherein the mask indicates one or more regions in which original information from the source image is to be preserved; and generating an output image based on the warped source image, the mask, and the decoded image, wherein the output image depicts the subject having the pose or the visage.

17. The non-transitory computer-readable storage medium of claim 16, the operations further comprising:

replacing the driving image with a modified driving image to mitigate appearance leakage from the driving image, wherein the modified driving image depicts a different subject having the pose or the visage.

18. The non-transitory computer-readable storage medium of claim 16, the operations further comprising:

utilizing the machine learning model to generate training pairs, wherein each training pair comprises the source image, the modified driving image, and the output image, and wherein the training pairs are utilized to train another machine learning model for generating portrait animations.

19. The non-transitory computer-readable storage medium of claim 16, the operations further comprising:

applying a global loss based on comparing an entirety of the output image with an entirety of the driving image.

20. The non-transitory computer-readable storage medium of claim 16, the operations further comprising:

applying a local region loss based on comparing local patches of the output image with corresponding local patches of the driving image, wherein the local patches comprise a local patch associated with a mouth region and local patches associated with eye regions.

* * * * *